US012674895B2

(12) United States Patent (10) Patent No.: US 12,674,895 B2
Parkins (45) Date of Patent: Jul. 7, 2026

(54) CALCULATING A POSITION OF ONE DEVICE RELATIVE TO ANOTHER

(71) Applicant: u-blox AG, Thalwil (CH)

(72) Inventor: Alex Parkins, Hemel Hempstead (GB)

(73) Assignee: u-blox AG, Thalwil (CH)

( * ) Notice: Subject to any disclaimer, the term of this patent is extended or adjusted under 35 U.S.C. 154(b) by 269 days.

(21) Appl. No.: 18/081,231

(22) Filed: Dec. 14, 2022

(65) Prior Publication Data

US 2023/0194731 A1 Jun. 22, 2023

(30) Foreign Application Priority Data

Dec. 16, 2021 (EP) ..................................... 21215191

(51) Int. Cl.
  *G01S 19/41* (2010.01)
  *G01S 19/39* (2010.01)
  *G01S 19/43* (2010.01)
(52) U.S. Cl.
  CPC ............ *G01S 19/41* (2013.01); *G01S 19/396* (2019.08); *G01S 19/43* (2013.01)
(58) Field of Classification Search
  CPC ......... G01S 19/41; G01S 19/396; G01S 19/43
  See application file for complete search history.

(56) References Cited

U.S. PATENT DOCUMENTS

| 2015/0289097 A1 | 10/2015 | Rudow et al. |
| 2016/0003948 A1 | 1/2016 | Loomis et al. |
| 2020/0158877 A1* | 5/2020 | Joosten ................. G01C 21/165 |
| 2023/0288571 A1* | 9/2023 | Gum ..................... G01S 19/215 |
| 2023/0400590 A1* | 12/2023 | Ashjaee .................. G01S 19/04 |

OTHER PUBLICATIONS

Extended Search Report in European Appln. No. 21215191.4, dated Jun. 1, 2022, 8 pages.

* cited by examiner

*Primary Examiner* — Steven Vu Nguyen
(74) *Attorney, Agent, or Firm* — Fish & Richardson P.C.

(57) ABSTRACT

A method and apparatus are provided for calculating a position of a first device relative to a reference device for a current time. The method comprises obtaining first reference GNSS measurements, made at the reference device for a first time, obtaining the position of the reference device for the first time, obtaining first device GNSS measurements, made at the first device for the current time, and calculating a first relative position between the first device at the current time and the reference device at the first time. The method further comprises obtaining second reference GNSS measurements, made at the reference device for a second time subsequent to the first time, calculating a position change of the reference device from the first time to the second time, and calculating the second relative position between the first device at the current time and the reference device at the second time.

12 Claims, 5 Drawing Sheets

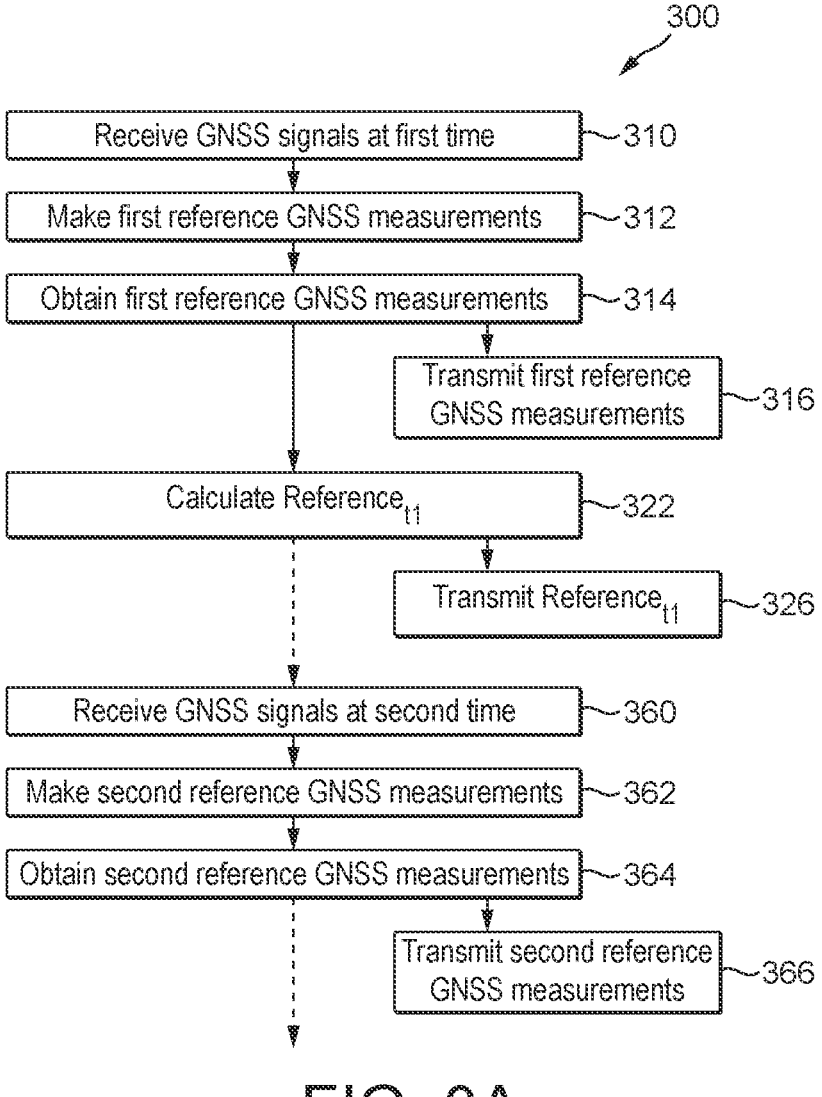

300

Receive GNSS signals at first time ~310

Make first reference GNSS measurements ~312

Obtain first reference GNSS measurements ~314

Transmit first reference GNSS measurements ~316

Calculate Reference$_{t1}$ ~322

Transmit Reference$_{t1}$ ~326

Receive GNSS signals at second time ~360

Make second reference GNSS measurements ~362

Obtain second reference GNSS measurements ~364

Transmit second reference GNSS measurements ~366

FIG. 3A

CALCULATING A POSITION OF ONE DEVICE RELATIVE TO ANOTHER

CROSS-REFERENCE TO RELATED APPLICATIONS

This application claims the benefit of priority to European Application No. 21215191.4, filed on Dec. 16, 2021, the contents of which are hereby incorporated by reference.

FIELD OF THE INVENTION

The present invention relates to positioning using Global Navigation Satellite Systems (GNSSs). In particular, it relates to positioning via a local differential method.

BACKGROUND OF THE INVENTION

Techniques for GNSS positioning are well known in the art. Each GNSS positioning technique requires at least one GNSS—some examples of which include the Global Positioning System (GPS), Galileo, GLONASS, and BeiDou. Each GNSS comprises a constellation of satellites, also known in the art as "space vehicles" (SVs), which orbit the Earth. A traditional GNSS positioning technique may comprise calculating a pseudorange from a GNSS receiver to each in-view SV. Such a traditional positioning technique may be a code-based positioning technique, wherein the code phase of a pseudorandom noise (PRN) code, modulated onto a carrier signal transmitted by an SV, is measured. The pseudoranges are used to calculate the position of the GNSS receiver by multilateration, based on the GNSS signals transmitted from at least four SVs and received by the GNSS receiver.

However, this is a low-precision positioning technique, which fails to address a number of positioning errors. For example, the GNSS signals can be delayed by varying amounts when passing through the ionosphere, as a result of the number of ionised particles in this layer of the atmosphere, or the troposphere, where variation in the delay is caused by the changing humidity, temperature, and/or atmospheric pressure.

Differential GNSS is a positioning technique that calculates the position of a moving GNSS receiver with greater accuracy, by calculating the position of a first GNSS receiver relative to a second (reference) GNSS receiver. Differential GNSS can be identified as a code-based positioning technique, as pseudorange measurements are used to calculate the relative position.

Often, the reference device has a fixed and well-known position. By calculating the position of the reference device by multilateration, the calculated position of the reference device can be compared to the known position of the reference device. The difference between the two positions, known as a differential correction, can be attributed to positioning errors such as atmospheric delay. If the reference device and first device are close together, the signals received by the first GNSS receiver and the second GNSS receiver can be modelled as having experienced very similar delay and/or errors. Therefore, as long as the reference device and first device are close together (typically, less than 20 km apart), the modelling is suitably accurate, and the differential correction can be applied to the calculated position of the first device, in order to obtain a more accurate position of the first device. A real-time connection, maintained between the reference device and first device, is used to send the differential correction to the first device. A relative position between the corrected positions of the first device and the reference device can be calculated at the first device.

Even if the position of the reference device is not known independently, differential corrections can still be calculated based on the residuals in the pseudoranges, after the position solution is calculated at the reference device. The residuals reflect the positioning errors caused by atmospheric delay and can be applied as corrections by the (nearby) first device when calculating its own position.

Real-time kinematic (RTK) positioning applies the differential GNSS technique, calculating the position of a first device relative to a reference device. However, RTK positioning can be identified as a carrier-based positioning technique, wherein carrier phase measurements (also known as carrier range measurements) are used to calculate the relative position. By deriving ranging measurements from the carrier signal, a calculation of the position of the first device can be achieved to a much greater precision, on the scale of centimetres. The carrier wave measurements are doubled differenced to form a new set of equations which can determine carrier phase ambiguities, and hence allow the position of the first device to be determined.

RTK positioning, and more generally differential GNSS positioning, can also be adapted to calculate the position of a first device relative to a moving reference device. The position of the first device relative to the reference device remains considerably more accurate than the absolute positions of the devices. Monitoring the relative position between a moving reference device and first device is useful for attitude monitoring, navigation, and surveying applications. In the case of moving reference device RTK positioning, centimetre-level accuracy is achievable.

SUMMARY OF THE INVENTION

For RTK GNSS positioning techniques, with a fixed or a moving reference device, it is desirable to minimise latency where possible. The present inventors have recognised that while a positioning system with a static reference device may be able to operate at a current time using reference GNSS measurements from earlier times, this is not suitable for a system with a moving reference device. For such a system, the reference GNSS measurements and/or the position of the reference device at a current time must be obtained by the first device, in order to compute an accurate relative position of the first device at the current time. However, this can result in undesirable latency, from the length of time it takes to calculate the position, velocity, and time (PVT) measurements of the reference device, and also the length of time it takes for the reference GNSS measurements to be encoded, transmitted to the first device, and decoded by the first device. A relatively large latency between the devices is undesirable, as it can result in the output latency of the first device (the calculation of the relative position of the first device) being larger than desired.

The invention is defined by the claims. According to a first aspect, there is provided a method of calculating a position of a first device relative to a reference device, each of the devices comprising a GNSS receiver, the method comprising:

obtaining first reference GNSS measurements, made at the reference device, for a first time;
  obtaining the position of the reference device, for the first time;
  obtaining first device GNSS measurements, made at the first device, for a current time;

calculating a first relative position of the first device, for the current time, relative to the position of the reference device, for the first time, based on the first device GNSS measurements;

obtaining second reference GNSS measurements, made at the reference device, for a second time, wherein the second time is subsequent to the first time;

calculating a position change of the reference device, from the first time to the second time, by comparing the first reference GNSS measurements and the second reference GNSS measurements; and calculating a second relative position of the first device, for the current time, relative to the position of the reference device, for the second time, by combining the first relative position and the calculated position change of the reference device.

The method may further comprise, before obtaining the first device GNSS measurements, receiving GNSS signals at the GNSS receiver of the first device, for the current time, and making first device GNSS measurements at the first device, for the current time, using the received GNSS signals.

The first time may correspond to a first epoch at the reference device and the second time may correspond to a second, later epoch at the reference device. In particular, the first and second times may relate to successive epochs at the reference device. The second time may relate to a current (or most recent) epoch at the reference device.

The current time may correspond to a current epoch at the first device. The current time (at the first device) may correspond approximately to the second time (at the reference device). However, these need not be aligned exactly, since epochs at the reference device may be slightly out of alignment with epochs at the first device.

The time difference between the second time and the current time may be less than 1 ms. The position of the reference device at the second time may be extrapolated over this difference in time (for example, using a constant-velocity model), such that the first device calculates the position of the reference device at the current time. Because the reference device and the first device both output a GNSS time, the first device can obtain an accurate time difference between the second time and the current time, in order to calculate the position of the reference device at the current time.

The first time at the reference device may correspond to the start of a first update interval at the reference device. The first update interval may span from the first time to the second time. The second time at the reference device may correspond to the start of a second update interval at the reference device. The current time at the first device may correspond to the start of a current update interval. The current update interval at the first device may correspond approximately to the second update interval at the reference device.

The update interval between successive epochs may be less than 2.0 s, optionally less than 1.5 s, optionally less than 1.0 s, optionally less than 0.5 s, optionally less than 0.3 s, and optionally less than 0.2 s. The update interval between successive epochs may be greater than 0.08 s, optionally greater than 0.10 s, optionally greater than 0.12 s. In general, all else being equal, it is desirable to have a shorter time difference between the first time and the second time, as there may be an increasing risk that for longer time differences there may be a loss of phase lock over an update interval.

The first relative position of the first device may be calculated based on the first device GNSS measurements, the first reference GNSS measurements, and the position of the reference device for the previous epoch. This can be done before the GNSS measurements of the reference device for the current epoch become available. Once these GNSS measurements of the reference device become available, the position change of the reference device and the second relative position of the first device can be calculated very quickly. This can enable calculating the second relative position of the first device with reduced latency. In particular, it should be noted that the (absolute) position of the reference device is in general not required for the calculation. Waiting for this to become available may increase latency in the calculation.

The first device and the reference device may both be mobile (and moving). In some examples, the first device may be a rover and the reference device may be a moving base. In other examples, the first device and reference device may be devices mounted to different parts of a vehicle.

The first device GNSS measurements may comprise at least carrier range measurements.

The first device GNSS measurements may further comprise pseudorange measurements.

The first reference GNSS measurements may comprise pseudorange measurements and carrier range measurements.

The first reference GNSS measurements may further comprise range rate measurements.

The second reference GNSS measurements may comprise at least carrier range measurements.

The second reference GNSS measurements may further comprise pseudorange measurements and/or range rate measurements.

Calculating the first relative position of the first device may comprise calculating a carrier phase differential solution.

The carrier phase differential solution may be based on: the position of the reference device, for the first time; the pseudorange measurements and carrier range measurements for the reference device for the first time; and the pseudorange measurements and the carrier phase measurements for the first device for the current time. The carrier phase differential solution may be calculated using a Kalman filter. Calculating the carrier phase differential solution may comprise estimating float carrier range ambiguities. Optionally it may comprise fixing the float carrier range ambiguities.

The carrier phase differential solution may be calculated similarly to a conventional real time kinematic (RTK) positioning solution. It comprises explicitly differencing measurements. In some examples, this is referred to as "double differencing"—forming differences between measurements made for the same satellite at different receivers, and subtracting these differences, to form differences across satellites and receivers. Double differencing involves a linear combination of four measurements.

Calculating the position change of the reference device may comprise calculating a delta carrier range solution.

The delta carrier range solution may be calculated based on the carrier range measurements for the reference device for the first time; and the carrier range measurements for the reference device for the second time. The delta carrier range solution may be calculated using a least squares estimation.

Alternatively or in addition, calculating the position change of the reference device may comprise obtaining a satellite range rate measurement for the reference device, and calculating the position change based on the satellite range rate measurement. The satellite range rate measurement may be based on a Doppler measurement associated with the first reference GNSS measurements. Use of a satellite range rate measurement in this way may be beneficial in particular in the event that the GNSS receiver loses phase lock on some of the GNSS signals.

The method may be performed entirely at the first device.

Obtaining the position of the reference device, for the first time may comprise receiving it from the reference device. Obtaining the first reference GNSS measurements may comprise receiving them from the reference device. Obtaining the second reference GNSS measurements may comprise receiving them from the reference device.

A computer program comprising computer program code may be configured to cause one or more physical computing devices to carry out all the steps of the method when the computer program is executed by said one or more physical computing devices.

The one or more physical computing devices may comprise or consist of at least one processor of a GNSS receiver module.

According to another aspect, there is provided a GNSS receiver module for a first device in an RTK positioning system, the RTK positioning system comprising the first device and a reference device, the GNSS receiver module comprising:

a GNSS receiver;

a receiver for receiving communications from the reference device; and at least one processor, configured to:

obtain, via the receiver, first reference GNSS measurements, made at the reference device, for a first time;

obtain, via the receiver, the position of the reference device, for the first time;

obtain, from the GNSS receiver, first device GNSS measurements, made at the first device, for a current time;

calculate a first relative position of the first device, for the current time, relative to the position of the reference device, for the first time;

obtain, via the receiver, second reference GNSS measurements, made at the reference device, for a second time, wherein the second time is subsequent to the first time;

calculate a position change of the reference device, from the first time to the second time, by comparing the first reference GNSS measurements and the second reference GNSS measurements; and calculate a second relative position of the first device, for the current time, relative to the position of the reference device, for the second time, by combining the first relative position and the calculated position change of the reference device.

The GNSS receiver may be configured to receive GNSS signals for the current time. The GNSS receiver may be configured to make first device GNSS measurements at the first device, for the current time, using the received GNSS signals.

The receiver for receiving communications from the reference device may be wireless or wired. Wired communication between the first device and reference device may be used, for example, if they are both mounted to different parts of the same vehicle or machine.

The GNSS receiver module may comprise an output, configured to output the data calculated by the processor and/or stored in the memory. The data calculated by the processor and/or stored in the memory, may be output to a separate device. The separate device may obtain the data for further processing, or may display the data.

According to another aspect, there is provided a reference GNSS receiver module for a reference device in an RTK positioning system, the RTK positioning system comprising a first device and the reference device, the reference GNSS receiver module comprising:

a GNSS receiver;

a transmitter, for transmitting communications to the first device;

at least one processor, configured to:

obtain first reference GNSS measurements, made by the GNSS receiver, for a first time, calculate, based on the first reference GNSS measurements, the position of the reference GNSS receiver module, for the first time;

obtain second reference GNSS measurements, made by the GNSS receiver, for a second time, wherein the second time is subsequent to the first time;

calculate, based on the second reference GNSS measurements, the position of the reference GNSS receiver module, for the second time, wherein the at least one processor is further configured to control the transmitter to transmit, to the first device:

one or more first messages comprising the first reference GNSS measurements and a timestamp indicating the first time;

one or more second messages comprising the position of the reference GNSS receiver module, for the first time; and one or more third messages comprising the second reference GNSS measurements and a timestamp indicating the second time.

The GNSS receiver of the reference GNSS receiver module may be configured to receive GNSS signals at the first time. The GNSS receiver may be configured to make first reference GNSS measurements, for the first time, using the GNSS signals received at the first time. The GNSS receiver may be configured to receive GNSS signals at the second time. The GNSS receiver may be configured to make second reference GNSS measurements, for the second time, using the GNSS signals received at the second time. The at least one processor may be further configured to control the transmitter to transmit to the first device one or more fourth messages, comprising the position of the reference GNSS receiver module, for the second time, and optionally a timestamp indicating the second time. The one or more fourth messages might not need to be transmitted to the first device in order to calculate the second relative position of the first device in the current update interval. However, the one or more fourth messages may be sent and stored in the memory of the first device, in order to calculate the second relative position of the first device for the update interval following the current update interval.

The one or more second messages may further comprise a timestamp indicating the first time, so that the first device will understand that the first position of the reference device is related to the first reference GNSS measurements. The one or more second messages may further comprise uncertainty data corresponding to the calculated position of the reference GNSS receiver module. The one or more fourth messages may further comprise uncertainty data corresponding to the calculated position of the reference GNSS receiver module.

The one or more first messages and the one or more third messages may be RTCM messages.

The one or more first messages and the one or more third messages may comprise separate messages for each GNSS constellation. For example, the one or more first messages may comprise one first message, comprising first GPS reference measurements obtained from GPS signals, and another first message, comprising first GLONASS reference measurements obtained from GLONASS signals.

At least one of the one or more second messages and at least one of the one or more fourth messages may also be RTCM messages.

The RTCM messages may be RTCM multiple signal messages (MSM).

At least one of the one or more second messages and at least one of the one or more fourth messages may be of a type defined as a proprietary extension to the RTCM standard.

The one or more second messages and the one or more fourth messages may both be formatted according to the same proprietary extension to the RTCM standard.

BRIEF DESCRIPTION OF THE DRAWINGS

The invention will now be described by way of example with reference to the accompanying drawings, in which:

FIG. 3A is a flowchart illustrating a method for calculating a position of the first device relative to the reference device, specifically illustrating the steps performed by the reference device;

Figure 1:
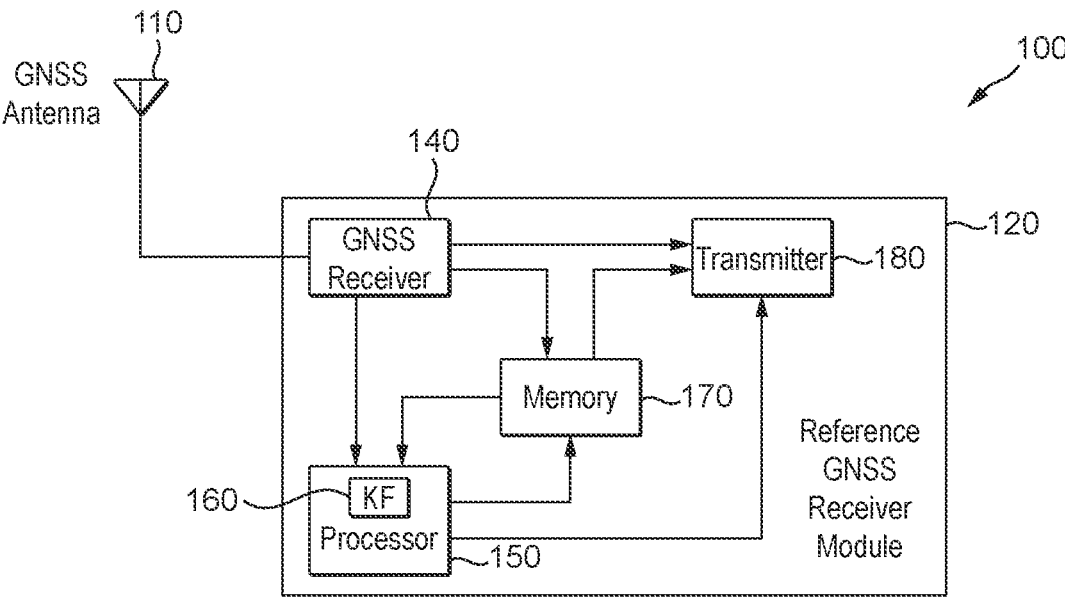
FIG. 1 is a schematic block diagram illustrating a reference device for an RTK positioning system, according to an example.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms. These and other features, aspects, and advantages of the apparatus, systems and methods of the present invention will become better understood from the following description, appended claims, and accompanying drawings. It should be understood that the same reference numerals are used throughout the Figures to indicate the same or similar parts.

Figure 2:
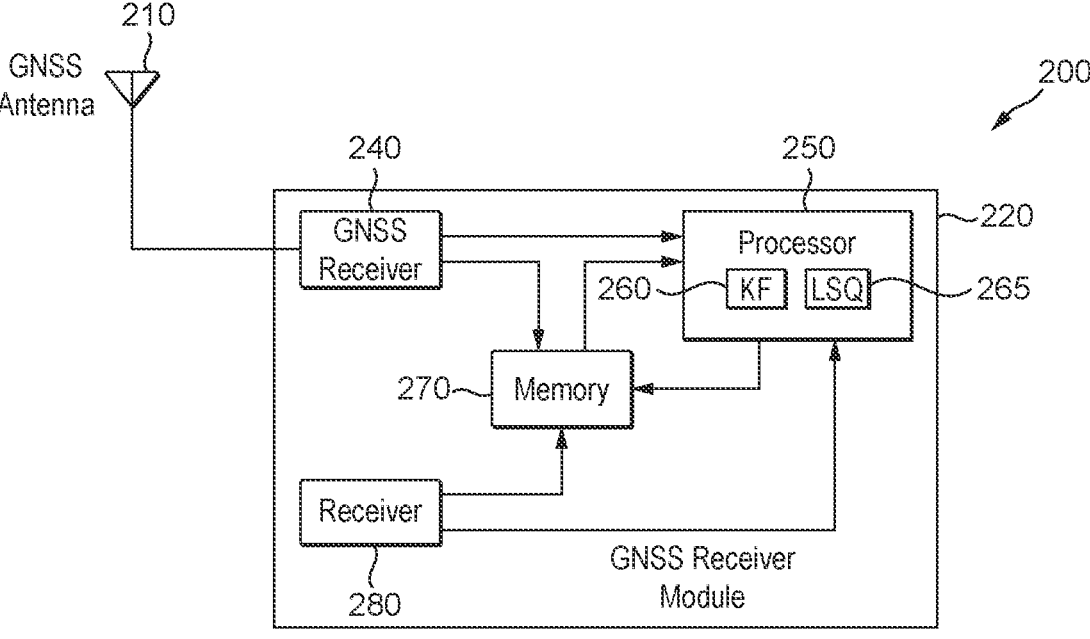
FIG. 2 is a schematic block diagram illustrating a first device for the RTK positioning system, according to an example.

FIGS. 1-2 illustrate separate components of a Real-Time Kinematic (RTK) positioning system, the RTK positioning system comprising a first device 200 and a reference device 100. In some examples, the first device 200 may be a rover and the reference device 100 may be a moving base station. In other examples, the first device 200 and reference device 100 may be devices mounted to different parts of a vehicle or other machine. Providing GNSS receivers mounted in different positions on the same vehicle may be useful for attitude determination, for example. The attitude of the vehicle can be determined based on the relative orientation of the two devices. The distance between the two devices may be constant, if they are mounted to rigidly arranged parts of the vehicle or machine. However, the distance may be variable, if the parts are articulated—for example, if one device is mounted to a crane arm or digger bucket and the other device is mounted to the body of the vehicle or machine.

FIG. 1 is a schematic block diagram of the reference device 100. The reference device comprises a GNSS antenna 110 and a reference GNSS receiver module 120. The GNSS antenna 110 is configured to receive GNSS signals. It may be configured to receive GNSS signals from a single GNSS constellation (for example, GPS), or it may be configured to receive GNSS signals from multiple constellations (for example, GPS, Galileo, GLONASS, and/or BeiDou). The reference GNSS receiver module 120 is configured to receive GNSS signals from the GNSS antenna 110 and to produce positioning data for the reference device 100. The reference GNSS receiver module 120 comprises a GNSS receiver 140, at least one processor 150, a memory 170, and a transmitter 180. The GNSS receiver 140 is configured to receive GNSS signals via the GNSS antenna 110, and to produce reference GNSS measurements from the obtained GNSS signals. The at least one processor 150 is configured to process reference GNSS measurements obtained from the GNSS receiver 140. While it should be understood that more than one processor can be present within the reference GNSS receiver module 120, for implementing methods according to embodiments, for the purposes of the present description we shall assume that there is only one processor 150, as depicted in FIG. 1. In the present example, the processor implements a Kalman filter (KF) 160—a recursive state estimator. At each of a plurality of time increments (epochs), the Kalman filter 160 estimates the current value of a state vector of state variables, along with their associated uncertainties. The estimate for the current state vector is based on the estimated state from the previous epoch and the current measurements. In the context of positioning, the state variables estimated by the Kalman filter 160 generally include position variables and optionally velocity and other variables. The use of Kalman filtering (also known as linear quadratic estimation) in GNSS positioning is well known in the art and will not be described in further detail here. The memory 170 is in communication with the processor 150. The memory 170 is configured to store software/firmware to be executed on the processor 150. The software/firmware is configured to control the processor 150 to carry out a processing method according to the present example, the method illustrated by FIGS. 3-5. The memory may also be configured to store data that is used as input to the processor 150 and/or to store data that is output by the processor 150. The transmitter 180 is configured to transmit some or all of the data that is output by the processor 150 to the first device 200. The processor 150 is further configured to control the transmitter 180 to transmit some or all of the data output by the processor 150 to the first device 200.

FIG. 2 is a schematic block diagram of the first device 200. As part of the RTK positioning system, along with the reference device 100, the first device 200 has many components in common with the reference device 100. The first device 200 comprises a GNSS antenna 210 and a GNSS receiver module 220. The GNSS receiver module 220 comprises a GNSS receiver 240, a receiver 280, at least one processor 250, and a memory 270. The GNSS receiver 240 is configured to receive GNSS signals via the GNSS antenna 210. The receiver 280 is configured to receive data sent by the transmitter 180 of the reference device. Hence, there is an active real-time connection over which positioning data is transmitted from the reference device 100 and received by the first device 200. The processor 250 is configured similarly to the processor 150 of the reference device. The processor 250 depicted in FIG. 2 implements a Kalman filter 260 and a least squares (LSQ) estimator 265. The Kalman filter and least squares estimator are configured to process the GNSS measurements obtained from the GNSS receiver 240 and/or the receiver 280. A memory 270 is also provided in the GNSS receiver module 220, in communication with the GNSS receiver 240, the processor 250, and the receiver 280. The memory 270 is configured similarly to the memory 170 of the reference device, to store data that is used as input to the processor 250, such as the data received from the GNSS receiver 240 and/or the receiver 280, and/or to store data that is output by the processor 250.

Figure 3B:
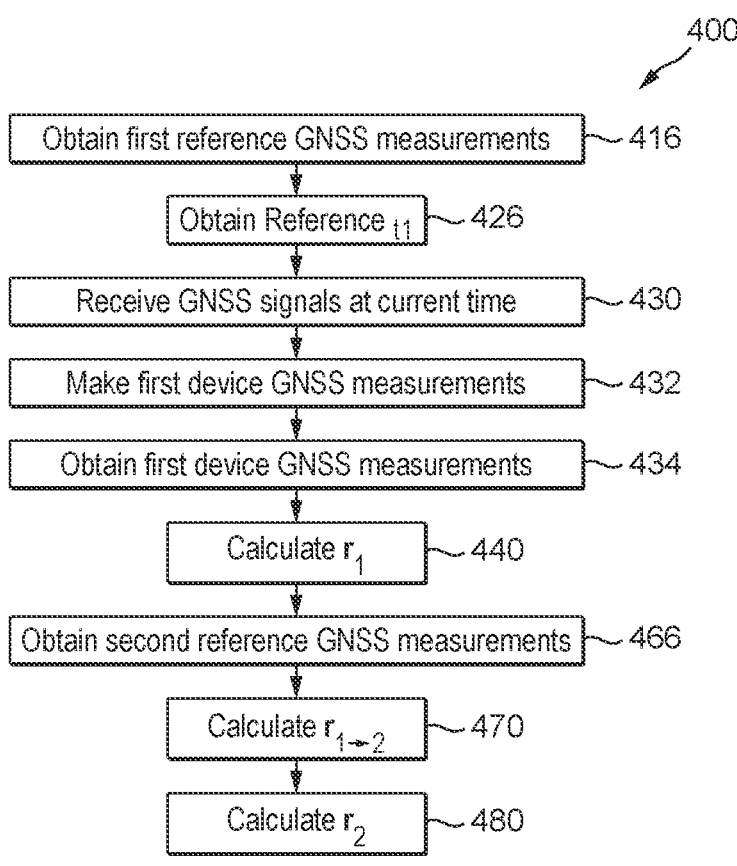
FIG. 3B is a flowchart illustrating a method for calculating a position of the first device relative to the reference device, specifically illustrating the steps performed by the first device.
Figure 4:
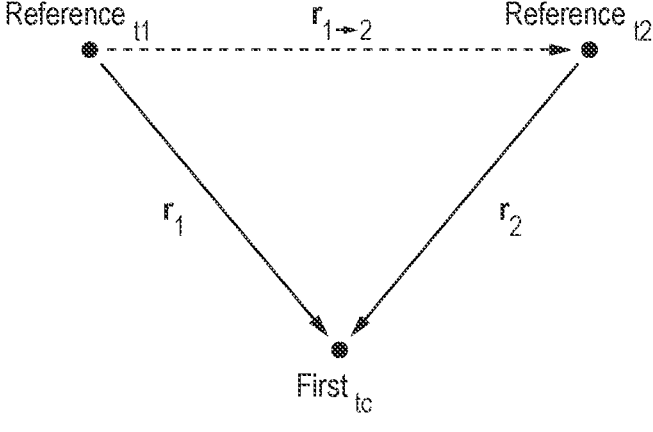
FIG. 4 is a vector diagram showing how the position of the first device relative to the reference device is calculated, according to the method of FIGS. 3A and 3B.

FIGS. 3A-3B illustrate a method for calculating a position, $r_2$, of the first device 200 relative to the reference device 100 at a current time (see FIG. 4). FIG. 3A illustrates the method steps 300 performed at the reference device. In step 310, at a first time, GNSS signals transmitted from one or more GNSS constellations at one or more carrier frequencies are received at the GNSS receiver 140 via the GNSS antenna 110 of the reference device. The first time signals the start of the first update interval at the reference device, an update interval being the length of time between consecutive epochs (times). In this example, the first time corresponds to a first epoch at the reference device, the second time corresponds to a second, successive epoch at the reference device, and the first update interval spans the length of time between the first epoch and second epoch. In step 312, first reference GNSS measurements are made by the GNSS receiver 140, from the GNSS signals received via the GNSS antenna 110. The processor 150 obtains the first reference GNSS measurements from the GNSS receiver 140, in step 314. These first reference GNSS measurements include carrier range measurements, and pseudorange measurements. The first reference GNSS measurements may also include range rate measurements. The first reference GNSS measurements may also include the Doppler frequency and carrier-to-noise ratio (C/N) for each carrier of each GNSS signal. At step 316, the first reference GNSS measurements obtained from the GNSS receiver are transmitted from the reference device 200 to the first device 100 via the transmitter 180. The processor 150 is configured to control the transmitter 180 to transmit the first reference GNSS measurements to the first device. In the present example, the transmitter 180 transmits one or more first messages, containing the first reference GNSS measurements and a timestamp indicating the first time associated with the first reference GNSS measurements. The transmitter 180 may transmit more than one first message if the GNSS signals received via the GNSS antenna 110 are transmitted from GNSS satellites in different GNSS constellations. For example, one first message may comprise first GPS reference measurements obtained from GPS signals, and another first message may comprise first GLONASS reference measurements obtained from GLONASS signals.

Messages transmitted from the transmitter 180 are transmitted according to a Radio Technical Commission for Maritime Services (RTCM) differential GNSS standard. The differential GNSS standards define a set of communication protocols for messages sent between reference stations (such as the reference device 100) and mobile receiver stations (such as the first device 200).

In the present example, the RTCM standard for differential GNSS services (RTCM-3) is used as a basis for the messages transmitted from the transmitter 180. In particular, the RTK positioning system is designed and programmed for use with the latest version of the RTCM-3 standard, RTCM 10403.3. The RTCM-3 standard was developed by RTCM Special Committee 104 as a more efficient alternative to the standard entitled "RTCM Recommended Standards for Differential GNSS Service, Version 2.x". RTCM-3 was designed to have a more efficient data format, improving upon the RTCM-2 parity scheme. The messages sent by the transmitter depend on the type of GNSS receiver, the GNSS constellation the GNSS signals received by the GNSS receiver originate from, and the carrier frequencies of the GNSS signals received by the GNSS receiver. It should be noted that RTCM-3 messages, such as the messages according to the RTCM 10403.3 standard, are not compatible with RTCM-2 receivers. Hence, each GNSS receiver in the present exemplary RTK positioning system is designed and programmed for use with RTCM-3 messages. In particular, the RTK positioning system is designed and programmed for use with RTCM-3 GNSS multiple signal messages (MSM), a generic message format that is followed by all GNSS systems to allow for GNSS receiver data interoperability. It should be noted however that the scope of the present invention is not limited to sending messages according to the RTCM standard, or to a specific version of the RTCM standard.

In step 322, the processor 150 calculates the first position of the reference device (at the first time), Reference$_{r1}$, using the first reference GNSS measurements obtained in step 314. The first position of the reference device is calculated by the processor 150 using the Kalman filter 160, which estimates the first position of the reference device based on the estimated position from the previous epoch (the epoch preceding the first time) and the current measurements—the first reference GNSS measurements. In step 326, the processor controls the transmitter 180 to transmit the first position of the reference device, Reference$_{r1}$, by sending one or more second messages. There are at least two possible ways to configure the one or more second messages. According to a first configuration, there may be just one second message, comprising the position of the reference GNSS receiver module for the first time, a timestamp indicating the first time, and uncertainty data. According to one example of the first configuration, the second message comprises the first position of the reference device, a timestamp indicating the first time, the first position covariance, the velocity of the reference device at the first time, the velocity covariance at the first time, the clock bias and clock drift, and their variances. According to this example, this second message is a proprietary extension to the RTCM standard, as the RTCM standard reference device position message does not include a timestamp, nor any uncertainty data. Each of the one or more first messages and the second message comprise a timestamp indicating the first time, so that the first device will understand that the first position of the reference device relates to the first reference GNSS measurements. While it may be preferable for the one or more second messages to comprise a timestamp indicating the first time, the present disclosure is not limited to this example. There may be other ways to establish the correspondence between the second message and the one or more first messages. According to a second, alternative configuration, the one or more second messages may comprise two messages: a first position message comprising the first position of the reference GNSS receiver module, Reference$_{r1}$; and a separate first time message, comprising a timestamp indicating the first time. According to one example of the second configuration, the first position message is an RTCM message, and the first time message is defined as a proprietary extension to the RTCM standard. The first time message comprises a timestamp indicating the first time and uncertainty data related to the first position of the reference device. The first time message is transmitted directly after the first position message has been transmitted. Upon receiving the first time message, a receiver that is compatible with the proprietary extension will understand that the first time message relates to the position information contained in the first position message.

While the one or more second messages can be constructed according to the second configuration described above, it may be preferable for the one or more second messages to be constructed according to the first configuration. If the first device and reference device are in an environment where there is unreliable message transportation, as a result of interference for example, it may be beneficial to send as few messages as possible between the reference device and first device. For example, according to the second configuration, it is possible that ambiguity may arise as to which first time message corresponds to which first position message, because of the loss of intervening messages. For these reasons, the present implementation uses the example of the first configuration, described above.

In the method illustrated by FIG. 3A, steps 310-326 take place in quick succession shortly after the first time, during the first update interval. In step 360, at a second time, new GNSS signals are received via the GNSS antenna 110 at the GNSS receiver 140. The method steps performed at the reference device are repeated starting at the second time, as they were performed when starting at the first time. The reception of GNSS signals at the second time signals the start of a new update interval, the second update interval, which follows immediately after the first update interval. In the present example, reference GNSS measurements are made, and the position of the reference device is calculated, at a frequency of 8 Hz, such that an update interval between successive epochs is 0.125 s. However, the present invention is not limited to this rate of calculation. The update interval between successive epochs may be less than 2.0 s, optionally less than 1.5 s, optionally less than 1.0 s, optionally less than 0.5 s, optionally less than 0.3 s, and optionally less than 0.2 s. The update interval between successive epochs may be greater than 0.08 s, optionally greater than 0.10 s, optionally greater than 0.12 s. In general, it is desirable to have a shorter time difference between the first time and the second time, as there may be an increasing risk that for longer time differences there may be a loss of phase lock over an update interval.

In step 362, second reference GNSS measurements are made at the GNSS receiver 140 using the GNSS signals received at the second time. In step 364, the processor 150 obtains the second reference GNSS measurements. In step 366, the second reference GNSS measurements are transmitted from the reference device by the transmitter 180. The second reference GNSS measurements and a timestamp indicating the second time are transmitted by the transmitter 180 as one or more third (RTCM) messages.

It should be noted that a second position of the reference device, Reference$_{r2}$, is calculated for the second time by the processor 150, subsequent to the second reference GNSS measurements being obtained from the GNSS receiver in step 364. It is not necessary to calculate the second position of the reference device, Reference$_{r2}$, in order to calculate the relative position of the first device with respect to the reference device at a current time, during a current update interval. However, the calculation of the second position of the reference device may be used to calculate the relative position of the first device for a time (epoch) later than the current time, during the update interval following the current update interval. The second position of the reference device at the second time is transmitted from the reference GNSS receiver module 120 as one or more fourth messages (not shown in FIG. 3A). Similar to the one or more second messages, there are at least two ways to configure the one or more fourth messages. According to a first configuration, there may be just one fourth message, comprising the position of the reference GNSS receiver module for the second time, Reference$_{r2}$, a timestamp indicating the second time, and uncertainty data. According to this configuration, this single fourth message is a proprietary extension to the RTCM standard, as the RTCM standard reference device position message does not include a timestamp, nor any uncertainty data. According to a second, alternative configuration, the one or more fourth messages may comprise two messages. Of these, one is a second position message, comprising the position of the reference GNSS receiver module at the second time. The other message is a second time message, comprising a timestamp indicating the second time, and uncertainty data. According to this second, alternative configuration, the second position message is an RTCM message, and the second time message is defined as a proprietary extension to the RTCM standard. The present implementation uses the first configuration (for the reasons already discussed above for the one or more second messages). The (single) fourth message and the (single) second message are formatted according to the same proprietary extension to the RTCM standard.

FIG. 3B illustrates the method steps 400 carried out by the first device, in order to calculate the position of the first device 200 relative to the reference device 100, r$_2$ (see FIG. 4).

The one or more first (RTCM) messages, comprising the first reference GNSS measurements and the timestamp indicating the first time, are received by the receiver 280, and obtained by the processor in step 416. (The first reference GNSS measurements may be stored in the memory 270 of the first device, until they are required for processing.) Next, the one or more second messages are received by the receiver 280, the one or more second messages containing the first position of the reference device, Reference$_{r1}$. The data contained within the one or more second messages is stored in the memory 270 of the first device, until required for further positioning processing. It is obtained by the processor 250 (either directly from the receiver 280, or indirectly, from the memory 270) in step 426.

In step 430, GNSS signals are received at the GNSS receiver 240 via the GNSS antenna 210 at the current time. Step 430 signals the start of the current update interval at the first device 200. In step 432, first device GNSS measurements are made by the GNSS receiver 240, using the GNSS signals received in step 430. In step 434, the first device GNSS measurements are obtained by the processor 250 from the GNSS receiver 240.

The current time (current epoch) at the first device corresponds approximately to the second time at the reference device. In general, it is not necessary for the current time at the first device to be aligned exactly with the second time of the reference device. That is, the two devices do not need to be synchronised. In the present example, the time difference between the second time and the current time is less than 1 ms. However, the present invention is not limited to such an example. The time difference between the second time and the current time is less than 1 ms, as the GNSS receivers in the first device and reference device keep their clocks aligned to GNSS time with 0.5 ms accuracy. The position of the reference device at the second time is propagated to the current time using a constant velocity model. The relationship between method steps that take place at (or shortly after) the first time at the reference device, the second time at the reference device, and the current time at the first device will be explained further with reference to FIG. 5.

The first device GNSS measurements obtained in step 434 include carrier range measurements and preferably pseudorange measurements. If the first device GNSS measurements include both carrier range measurements and pseudorange measurements, the relative position solution of the first device and the reference device will generally be more reliable. The first device GNSS measurements may also include the Doppler frequency and carrier-to-noise ratio (C/N) for each carrier of each GNSS signal.

In step 440, the processor 250 calculates a first relative position, $r_1$, between the first device at the current time, and the reference device at the first time. The first relative position will be used to calculate the second relative position, $r_2$—the position of the first device at the current time relative to the reference device at the second time. The first relative position, $r_1$, can be calculated before the second reference GNSS measurements become available. By calculating and/or obtaining as much of the data required to calculate $r_2$ as possible, before the second reference GNSS measurements are received at the first device, latency arising from the calculation of the second relative position may be reduced.

The method of calculating the first relative position of the first device, in step 440, comprises calculating a carrier phase differential solution. The carrier phase differential solution is calculated via a double differencing method, using the pseudoranges and carrier phase measurements received at the reference device and the first device from at least four different satellites. Double differencing methods are well-known in the art, and shall not be described in any further detail here. The first relative position, $r_1$, is calculated using the processor 250 of the first device to perform the double differencing method.

The second reference GNSS measurements, associated with the second time, are received at the receiver 280 from the transmitter 180. These second reference GNSS measurements include carrier range measurements, and preferably include pseudorange measurements. The second reference GNSS measurements may also include range rate measurements. The second reference GNSS measurements (and the associated timestamp indicating the second time) are received by the receiver 280 in the one or more third messages. They are obtained by the processor 250 in step 466. The first device does not have to wait for the reference device to calculate its position at the second time, before calculating the second relative position; the first device is able to calculate the second relative position once the second reference GNSS measurements have been obtained by the first device, hence minimising latency. In other words, the first device may begin (and may even finish) calculating the second relative position without necessarily obtaining, or before it obtains, from the reference device, the position of the reference device at the second time. This is done through steps 470 and 480, as described below.

Once the processor 250 of the first device has obtained the second reference GNSS measurements in step 466, the change in position of the reference device from the first time to the second time can be calculated, in step 470. Determining the position change of the reference device, $r_{1 \to 2}$, comprises calculating a delta carrier range solution. The least squares estimator 265 in the processor of the first device can estimate the delta carrier range solution, using the difference in the carrier range measurements of the reference device for the first time and the second time.

In step 480, the second relative position of the first device, $r_2$, is calculated. The vector diagram of FIG. 4 illustrates how this is done. Illustrated on the vector diagram is the position of the reference device at the first time, Reference$_{r1}$, the position of the reference device at the second time, Reference$_{r2}$, and the position of the first device at the current time, First$_{tc}$. Also labelled on FIG. 4 are the relative displacement vectors between each of the positions:

$r_1$, the first relative position of the first device, calculated at step 440;

$r_{1 \to 2}$, the change in position of the reference device from the first time to the second time, calculated at step 470; and $r_2$, the second relative position of the first device, the parameter to be determined at step 480.

As both $r_1$ and $r_{1 \to 2}$ have been calculated, a single vector subtraction operation is all that is required to find the second relative position of the first device:

$$r_2 = r_1 - r_{1 \to 2}$$

This operation (step 480) is performed by the processor 250. The position change, $r_{1 \to 2}$, of the reference device and the second relative position, $r_2$, of the first device are quantities which can be calculated very quickly once the reference GNSS measurements for the second time are obtained. As a result, the relative position, $r_2$, of the first device at the current time can be calculated with reduced latency.

Figure 5:
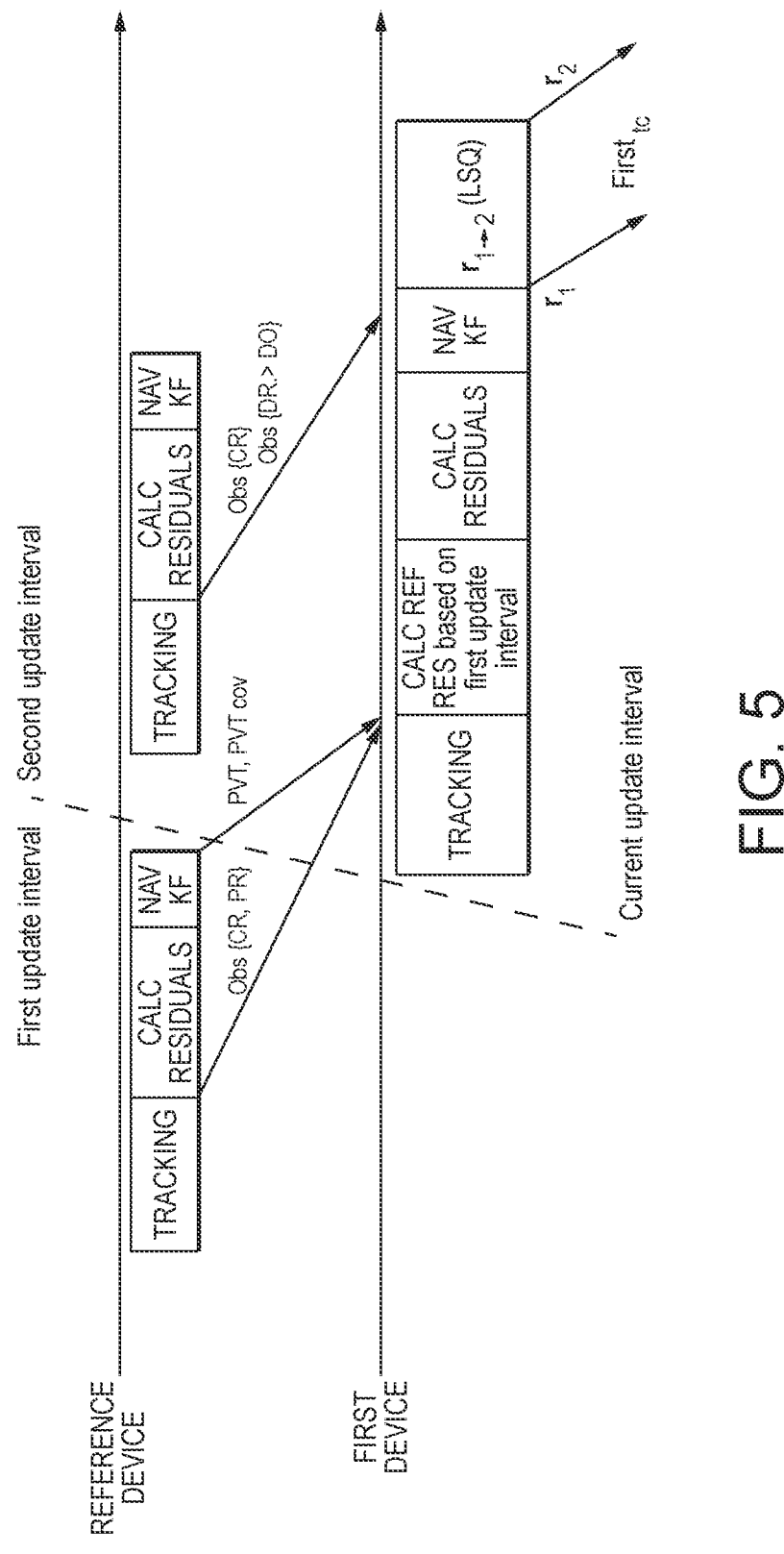
FIG. 5 is a schematic timing diagram illustrating the steps performed by the reference device, the steps performed by the first device, and the interaction between them.

FIG. 5 illustrates the method for calculating the relative position, $r_2$, of the first device, more specifically illustrating how the method 300 performed at the reference device relates temporally to the method 400 performed by the first device. Time runs from left to right in this timing diagram. The blocks of processing performed by the reference device to the left of the dotted line take place during the first update interval. The blocks performed by the reference device to the right of the dotted line are carried out during the second update interval. The blocks performed by the first device to the right of the dotted line are carried out during the current update interval. It is clear from FIG. 5 that the reference device and first device time scales are not perfectly synchronised—the current time at the first device happens before the second time at the reference device.

During the tracking phase of the reference device during the first update interval, first reference GNSS measurements comprising GNSS observables such as code ranging and phase ranging measurements are determined. The first reference GNSS measurements made at the GNSS receiver are then transmitted to first device 200, via the one or more first messages, as described above. This transmission of the first reference GNSS measurements is roughly illustrated by the "Obs (CR, PR)" arrow, indicating when the first reference GNSS measurements are calculated at the reference device, and when they are used at the first device. The remainder of the first update interval comprises calculating residuals, and calculating a position, velocity, and time (PVT) solution and PVT covariance solution using the Kalman filter 160. The calculation of the PVT solution in the first update interval comprises the calculation of the first position of the reference device, Reference$_{r1}$, in step 322. The transmission of the first position of the reference device is roughly illustrated by the "PVT, PVT cov" arrow, indicating when Reference$_{r1}$ is calculated at the reference device, and when Reference$_{r1}$ is used in the first device. Once the processor 150 has calculated the first position of the reference device, Reference$_{r1}$, the reference device waits until the second time, when the second update interval begins, repeating the method performed during the first update interval.

During the tracking phase of the first device at the current update interval, GNSS signals are received at the GNSS receiver 240 via the GNSS antenna 210, and the first device GNSS measurements are made (steps 430 and 432). Illustrated in FIG. 5 by the "Obs (CR, PR)" arrow and the "PVT, PVT cov" arrow, the first device then receives the first reference GNSS measurements and the position of the reference device at the first time (see steps 416 and 426). These are used to calculate the residuals for the reference device corresponding to the first time (see "CALC REF RES based on first update interval" block of the first device). Next, the first device calculates its own residuals—that is, the residuals for the current time, based on the first device GNSS measurements (see "CALC RESIDUALS" block of the first device). After that, the processor 250 of the first device updates the state vector of its Kalman filter, based on the GNSS measurements. In other words, the first relative position of the first device, $r_1$, is calculated by the "NAV KF" block, illustrated by the "$r_1$" arrow. At this step in the method, the position of the first device (at the current time), First$_{rc}$, may also be calculated. The positions calculated in the methods (300, 400), including First$_{rc}$, may be calculated according to the Earth-centred Earth-fixed coordinate system (ECEF). By this point, the "new" (second) reference GNSS measurements have been obtained (step 466) from the reference device, illustrated by the "Obs" arrow, which originates from the tracking block of the reference device in the second update interval. These obtained and calculated measurements are used to calculate the position change of the reference device, $r_{1 \to 2}$, by means of the delta carrier range solution provided by the LSQ filter. Having calculated the first relative position, $r_1$, and the position change of the reference device, $r_{1 \to 2}$, the second relative position, $r_2$, can also be calculated via the processor 250.

It should be noted that the above-mentioned embodiments illustrate rather than limit the invention, and that those skilled in the art will be able to design many alternative embodiments without departing from the scope of the appended claims.

The RTK positioning system may comprise more than one first device. For example, the RTK positioning system may comprise a reference device, a first device, and a second device, wherein the second device operates similarly to the first device discussed above.

Each receiver module may comprise a plurality of processors in order to calculate the second relative position of the first device. For example, the GNSS receiver module may comprise a first processor, configured to calculate the first relative position of the first device and the second relative position of the first device, and a second processor, configured to calculate a position change of the reference device. In this example, the first processor may contain the Kalman filter 260, while the second processor in the GNSS receiver module may contain the least squares estimator 265.

As mentioned previously above, the transmitter 180 and receiver 280 may use wired or wireless communication (for example, a radio link), depending on how the modules are installed and used.

In one example, the messages sent from the transmitter 180 may differ from the messages specified in the example described above. For example, a proprietary format may be used, instead of relying upon the RTCM standard. Alternatively, a different RTCM differential GNSS standard may be used, instead of RTCM 10403.3. In one example, the alternative current RTCM differential GNSS standard may be adhered to—RTCM 10402.3. In such an example, the receiver in the reference device and in the first device may be compatible with Version 2 messages, instead of Version 3 messages.

In the example described previously above, both the reference GNSS measurements for the first time and the position of the reference device at the first time were sent to the first device. This is not essential. In an alternative implementation, it may be sufficient to send the reference GNSS measurements to the first device, and the first device may then calculate the position of the reference device at the first time. It should be noted that this may increase the computational burden on the first device, however.

The method illustrated in FIG. 3B is not limiting on the scope of the invention. For example, the order of some of the steps of the method 400 may be rearranged, without impacting the operation of the system. In one example, the first device may receive GNSS signals at the current time (step 430), make first device GNSS measurements (step 432), and obtain first device GNSS measurements (step 434) at the processor, before any reference data has been obtained by the first device. The first reference GNSS measurements sent in the first message, and the first position of the reference device sent in the second message, may therefore be received by the receiver 280 either during the current update interval (before or after the first device GNSS measurements are obtained by the processor), or during a preceding update interval (and therefore before the first device GNSS measurements are obtained). If the reference data is the last piece of information obtained by the processor, it might not need to be stored in the memory 270, and may instead be obtained by the processor 250 directly from the receiver 280. In all the examples within the scope of the invention, the first reference GNSS measurements are obtained (step 416) and the first device GNSS measurements are obtained (step 434) by the processor 250 before the first relative position, $r_1$, can be calculated (step 440) by the processor 250, in order for the RTK positioning system to operate.

The $r_1$, $r_{1 \to 2}$, and $r_2$ relative position quantities calculated for the current time may be stored in the memory 270 of the first device. If the first device and reference device are fixed relative to each other (for example, they are both fixed onto rigidly mounted parts of the same vehicle or machine), then the magnitude of $r_2$ (which is the distance between the two antennae) should be known and should remain approximately constant between epochs. (The only deviations stemming from the fact that the epochs at the two devices are not synchronised.)

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of calculating a position of a first device relative to a reference device, each of the devices comprising a Global Navigation Satellite System (GNSS) receiver, the method comprising:
obtaining, from the reference device, first reference GNSS measurements, made at the reference device, for a first time;
obtaining, from the reference device, a position of the reference device, for the first time;
receiving, at a GNSS receiver of the first device, GNSS signals from at least one GNSS satellite;
obtaining first device GNSS measurements based on the GNSS signals, made at the first device, for a current time;
calculating a first relative position of the first device, for the current time, relative to the position of the reference device, for the first time, based on the first device GNSS measurements;
obtaining, from the reference device, second reference GNSS measurements, made at the reference device, for a second time, wherein the second time is subsequent to the first time;
calculating a position change of the reference device, from the first time to the second time, by comparing the first reference GNSS measurements and the second reference GNSS measurements; and
calculating a second relative position of the first device, for the current time, relative to the position of the reference device, for the second time, by combining the first relative position and the calculated position change of the reference device, wherein calculating the first relative position begins before obtaining second reference GNSS measurements, thereby reducing a latency in calculating the second relative position of the first device.

2. The method of claim 1, wherein the first device GNSS measurements comprise at least carrier range measurements.

3. The method of claim 1, wherein the first reference GNSS measurements comprise pseudorange measurements and carrier range measurements.

4. The method of claim 1, wherein the second reference GNSS measurements comprise at least carrier range measurements.

5. The method of claim 1, wherein calculating the first relative position of the first device comprises calculating a carrier phase differential solution.

6. The method of claim 1 wherein calculating the position change of the reference device comprises calculating a delta carrier range solution.

7. The method of claim 1, performed entirely at the first device.

8. The method of claim 1 wherein calculating the second relative position occurs before or without obtaining, from the reference device, a position of the reference device at the second time.

9. One or more tangible, non-transitory, computer-readable media storing instructions that, when executed by one or more machines, cause the one or more machines to perform operations comprising:
obtaining, from a reference device, first reference Global Navigation Satellite System (GNSS) measurements, made at the reference device, for a first time, wherein the reference device comprises a GNSS receiver;

obtaining, from the reference device, a position of the reference device, for the first time;

receiving, at a GNSS receiver of a first device, GNSS signals from at least one GNSS satellite;

obtaining first device GNSS measurements based on the GNSS signals, made at a first device, for a current time, wherein the first device comprises a GNSS receiver;

calculating a first relative position of the first device, for the current time, relative to the position of the reference device, for the first time, based on the first device GNSS measurements;

obtaining, from the reference device, second reference GNSS measurements, made at the reference device, for a second time, wherein the second time is subsequent to the first time;

calculating a position change of the reference device, from the first time to the second time, by comparing the first reference GNSS measurements and the second reference GNSS measurements; and calculating a second relative position of the first device, for the current time, relative to the position of the reference device, for the second time, by combining the first relative position and the calculated position change of the reference device, wherein calculating the second relative position begins before obtaining second reference GNSS measurements, thereby reducing a latency in calculating the second relative position of the first device.

10. The one or more tangible, non-transitory, computer-readable media of claim 9, wherein calculating the second relative position occurs before or without obtaining, from the reference device, a position of the reference device at the second time.

11. A Global Navigation Satellite System (GNSS) receiver module for a first device in a real-time kinematic (RTK) positioning system, the RTK positioning system comprising the first device and a reference device, the GNSS receiver module comprising:

a GNSS receiver configured to receive, from at least one GNSS satellite, GNSS signals, and obtain first device GNSS measurements based on the GNSS signals;

a second receiver for receiving communications from the reference device; and at least one processor configured to:

obtain, via the second receiver, first reference GNSS measurements, made at the reference device, for a first time;

obtain, via the second receiver, a position of the reference device, for the first time;

obtain, from the GNSS receiver, the first device GNSS measurements, made at the first device, for a current time;

calculate a first relative position of the first device, for the current time, relative to the position of the reference device, for the first time;

obtain, via the second receiver, second reference GNSS measurements, made at the reference device, for a second time, wherein the second time is subsequent to the first time;

calculate a position change of the reference device, from the first time to the second time, by comparing the first reference GNSS measurements and the second reference GNSS measurements; and calculate a second relative position of the first device, for the current time, relative to the position of the reference device, for the second time, by combining the first relative position and the calculated position change of the reference device, wherein calculation of the second relative position is configured to begin before the second reference GNSS measurements are obtained to reduce a latency in calculating the second relative position of the first device.

12. The GNSS receiver module of claim 11, wherein calculating the second relative position occurs before or without obtaining, from the reference device, a position of the reference device at the second time.

* * * * *